United States Patent
Matsushima et al.

(10) Patent No.: US 7,596,361 B2
(45) Date of Patent: Sep. 29, 2009

(54) LOW NOISE AMPLIFICATION CIRCUIT

(75) Inventors: Sadao Matsushima, Tokyo (JP); Toshihide Fukuchi, Tokyo (JP); Yuji Nakagawa, Tokyo (JP); Shiro Koide, Aichi (JP)

(73) Assignees: The Furukawa Electric Co., Ltd., Tokyo (JP); Denso Corporation, Kariya (JP)

( * ) Notice: Subject to any disclaimer, the term of this patent is extended or adjusted under 35 U.S.C. 154(b) by 484 days.

(21) Appl. No.: 11/442,326

(22) Filed: May 30, 2006

(65) Prior Publication Data
US 2006/0270380 A1  Nov. 30, 2006

(30) Foreign Application Priority Data
May 30, 2005 (JP) ............................. 2005-157951

(51) Int. Cl.
*H04B 1/10* (2006.01)
*H04B 1/16* (2006.01)

(52) U.S. Cl. ....................... 455/296; 455/283; 455/293; 455/341

(58) Field of Classification Search ................. 455/138, 455/193.1–193.2, 269, 275–278.1, 283–285, 455/291, 293, 333, 338–341
See application file for complete search history.

(56) References Cited

U.S. PATENT DOCUMENTS

| | | | |
|---|---|---|---|
| 6,735,418 B1 * | 5/2004 | MacNally et al. | 455/78 |
| 6,768,377 B2 * | 7/2004 | Macedo | 330/51 |
| 7,035,611 B2 * | 4/2006 | Garlepp et al. | 455/269 |
| 7,218,909 B2 * | 5/2007 | Rofougaran et al. | 455/333 |
| 7,389,091 B2 * | 6/2008 | Tanaka | 455/126 |
| 2001/0015675 A1 * | 8/2001 | Cho et al. | 330/284 |
| 2006/0238248 A1 * | 10/2006 | Chang | 330/253 |

FOREIGN PATENT DOCUMENTS

| | | |
|---|---|---|
| JP | 7-58657 | 3/1995 |
| JP | 2002-164803 | 6/2002 |

* cited by examiner

*Primary Examiner*—Simon D Nguyen
(74) *Attorney, Agent, or Firm*—Oblon, Spivak, McClelland, Maier & Neustadt, L.L.P.

(57) ABSTRACT

A low noise amplification circuit comprises a low noise amplifier and a filter coupled to the input terminal of the low noise amplifier. The low noise amplifier comprises an amplifying element and a matching input circuit coupled to the input terminal of the amplifying element. When $\gamma_s$ shows a reflection factor in the case that signals flow from the input terminal of the amplifying element to the output terminal of the matching input circuit, impedance conversion for setting the $\gamma_s$ at a desired value is made entirely or in part by means of setting the output impedance of the filter at the value different from that of characteristic impedance.

6 Claims, 12 Drawing Sheets

Frequency Characteristic of Insertion Loss

Fig.4b

Frequency Characteristic of Reflection Factor

Fig.5a (Prior Art)

Frequency Characteristic of Insertion Loss

Fig.5b (Prior Art)

Frequency Characteristic of Reflection Factor

Frequency Range: 100 MHz ~ 3000 GHz

Fig.6a

Frequency Characteristic of Insertion Loss

Fig.6b

Frequency Characteristic of Reflection Factor

Frequency Range: 500 MHz ~ 2500 GHz

Gain Frequency Characteristic

Fig.9b

Noise Figure Characteristic

Fig.10a (Prior Art)

Gain Frequency Characteristic

Fig.10b (Prior Art)

Noise Figure Characteristic

Fig. 11a

Frequency Characteristic of Insertion Loss

Fig. 11b

Frequency Characteristic of Reflection Factor

Frequency Range: 100 MHz ~ 3000 GHz

Fig. 12a

Gain Frequency Characteristic

Fig. 12b

Noise Figure Characteristic

Fig.13

LOW NOISE AMPLIFICATION CIRCUIT

BACKGROUND OF THE INVENTION

1. Field of the Invention

The present invention relates to a low noise amplification circuit which amplifies high-frequency and weak signals received by means of antennas, and especially relates to a low noise amplification circuit which comprises at least one filter coupled to the input terminal of a low noise amplifier to remove undesired frequency components.

2. Description of the Related Art

Generally, wireless instruments, such as cellular phones or GPS devices, include at least one receiving device with a low noise amplifier (LNA) which amplifies signals within predetermined frequency bands received by means of antennas. However, the antennas receive not only signals within a desired frequency band, but also signals with undesired frequency components near the desired frequency band. For instance, when another wireless instrument is placed close to the receiving device, and transmits or receives radio waves with so large electric field, the undesired frequency components might be received with so large level compared to the signals within the desired frequency bands. As a result, it is likely that the LNA is saturated with the undesired frequency components such that the LNA cannot amplify the signals within the desired frequency bands.

In order to prevent the problem described above, there is proposed a receiving device in which undesired components are removed by at least one filter coupled to the input terminal of the LNA (ex. JP07-058657A, JP2002-164803A). JP07-058657A discloses a receiving device in which undesired components are removed by a band-pass filter coupled to a front end of the LNA. JP2002-164803A discloses a receiving device in which specific frequency bands close to desired frequency bands are removed by a trap circuit arranged between the antenna and the LNA as a band-stop filter.

Figure 13:
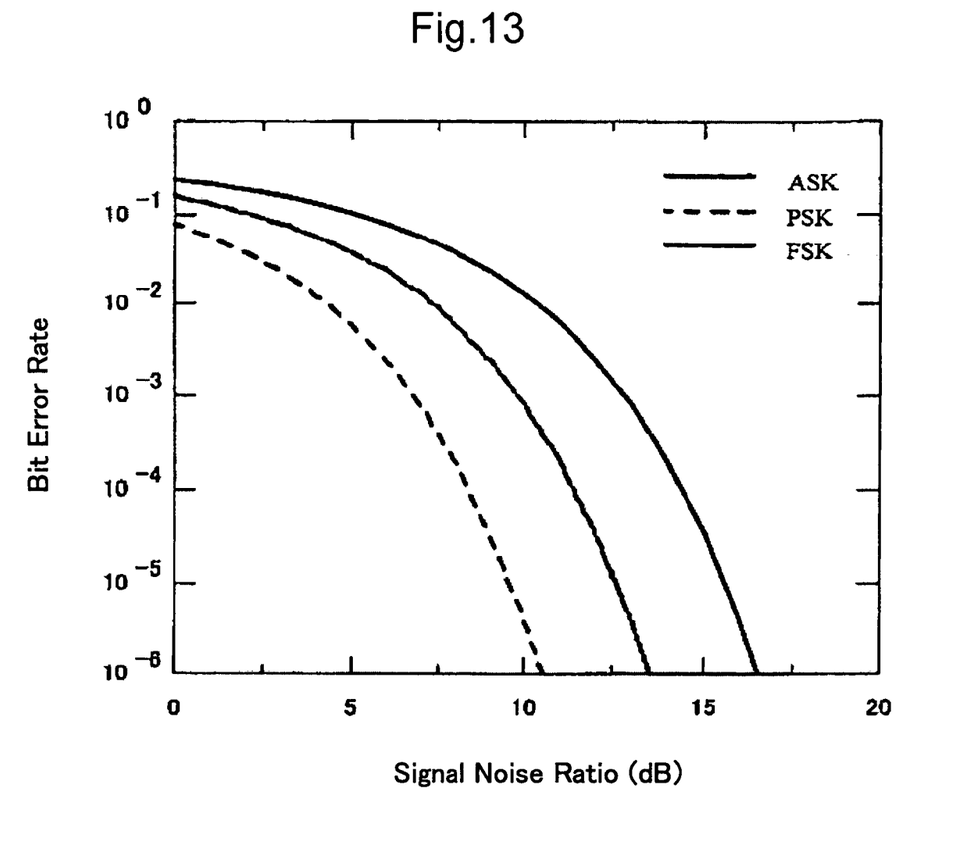
FIG. 13 shows deteriorations of bit error rates along with deteriorations of signal-noise ratios in various digital modulation methods.

In the conventional receiving device as described above, the filter coupled to the input terminal of the LNA yields an insertion loss for the signals within the desired frequency band. In general, since a noise figure of a whole circuit is roughly determined due to a noise figure of the first stage of the circuit, the loss yielded before the LNA significantly affects the noise figure of a whole circuit. Accordingly, when a filter is arranged at the front end of the LNA, the insertion loss of the filter directly leads to the deterioration of the noise figure of the whole circuit. When the noise figure is deteriorated due to the filter arrangement, a receiving quality is deteriorated in a receiving instrument for, in particular, the digital modulation system. More specifically, the FIG. 13 shows that the transmitting quality or the transmitting speed is degraded because a bit error rate is significantly deteriorated along with a signal-noise ratio in various digital transmitting systems. When the circuit is applied to a receiving instrument for satellite signals, the communication area might scale down due to the degradation of minimum receiver sensitivity. To solve the problem, it is possible to employ a high performance LNA with excellent noise characteristic, however, it is inevitable that the cost must run much high. When a high performance filter is employed in order to reduce the insertion loss of the filter, a similar problem occurs.

BRIEF SUMMARY OF THE INVENTION

An object of the present invention is to solve the problem as described above. More specifically, the present invention intends to make it possible to produce a low noise amplification circuit with excellent noise characteristic in which the deterioration of noise figure due to the insertion loss of the filter is reduced while the undesired frequency components are removed by the filter arranged at the input side of the LNA.

In a first aspect of the present invention, a low noise amplification circuit which amplifies signals by a predetermined gain, comprises at least a low noise amplifier including at least an amplifying element and a matching input circuit coupled to an input terminal of the amplifying element, and a filter coupled to an input terminal of the low noise amplifier, wherein when $\gamma_s$ represents a reflection factor, impedance conversion for the $\gamma_s$ to be set at a desired value is made entirely or in part in such manner that an output impedance of the filter at the value is set to be different from that of characteristic impedance in a case that signals flow from the input terminal of the amplifying element to the output terminal of the matching input circuit.

According to this aspect of the present invention, the input signals to the low noise amplification circuit are within desired frequency bands in the result of removing undesired frequency components by means of the filter, input to the amplifying element through the matching input circuit, and are amplified at a predetermined gain. In this case, the output impedance of the filter is set to a value different from the characteristic impedance. For example, a field-effect transistor (FET) or a bipolar transistor are used as the amplifying element, the noise figure is determined depending on the amplifying element. The matching input circuit is used in order to convert the impedance from the output impedance of the filter to the input impedance of the amplifying element, and can be designed by either a lumped-constant circuit or a distributed constant circuit.

In another aspect of the present invention, a following formula is satisfied:

$$L_i < L_f + N_m - 10 \log(1 - |\gamma_s|^2)$$

where $L_f$ (dB) represents an insertion loss of the filter in a case that both of the input and output impedances are set to be the characteristic impedance, $L_i$ (dB) represents an insertion loss of a circuit consisting of the matching input circuit and the filter of which output impedance is different from the characteristic impedance, $N_m$ (dB) represents a degradation amount of noise figure of the matching input circuit.

It is necessary to set the reflection factor of the matching input circuit in order to optimize the noise figure of the low noise amplification circuit so that the above formula is met. In this case, a noise-optimized signal-source reflection factor $\gamma_{opt}$ for optimizing the noise figure is determined depending on the kind of the amplifying element and the use conditions, and therefore the reflection factor at the output terminal of the matching input circuit is set to the value close to the $\gamma_{opt}$. As a result, the insertion loss of the input signals and the deterioration amount of the noise figure is concerned appropriately. Like this, an optimally designed low noise amplification circuit has an excellent noise characteristic along with a necessary gain compared to the conventional design method based upon the characteristic impedance.

In another aspect of the present invention, the $L_f$ (dB), the $L_i$ (dB), the $N_m$ (dB) and the $\gamma_s$ satisfy a following formula:

$$L_i < L_f + N_m - 10 \log(1 - |\gamma_s|^2) - 0.1$$

In another aspect of the present invention, the L.sub.f (dB), the L.sub.i (dB) and the gamma.sub.s satisfy a following formula:

$$L_i < L_f - 10 \log(1 - |\gamma_s|^2)$$

These aspects of the present invention make it possible to perform the above impedance conversion more accurately along with the above advantage of the present invention, and therefore to improve the more excellent noise characteristic.

In another aspect of the present invention, the gamma.sub.s is approximately equal to a gamma.sub.opt, which is a noise-optimized signal-source reflection factor of the amplifying element.

In another aspect of the present invention, the matching input circuit of the low noise amplification circuit consists of a reactance element.

According to the above aspect of the present invention, the low noise amplification circuit has a impedance conversion with a simple circuit made of such a reactance element as series inductances or parallel capacitance.

In another aspect of the present invention, the input signals are high-frequency signals received by means of an antenna.

According to the above aspect of the present invention, the low noise amplification circuit can amplify weak high-frequency signals received by means of an antenna with the optimum noise characteristic, and therefore can realize a receiving device with excellent receiving performances.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4a and FIG. 4b show the characteristics of the filter designed as an embodiment according to the present invention.

FIG. 5a and FIG. 5b show the characteristics of a filter with a conventional construction corresponding to the filter according to the present embodiment.

FIG. 6a and FIG. 6b show the characteristics of the circuit part made of the filter and the matching input circuit coupled to the output terminal of the filter according to the embodiment.

FIG. 7a and FIG. 7b show the concept of impedance transformation in order to change the reflection factor gammma.sub.mid to gammma.sub.opt in a Smith chart.

FIG. 8a and FIG. 8b show constructional examples of the matching input circuit in order to realize the impedance transformation in FIG. 7a and FIG. 7b.

DETAILED DESCRIPTION OF THE INVENTION

Figure 1:
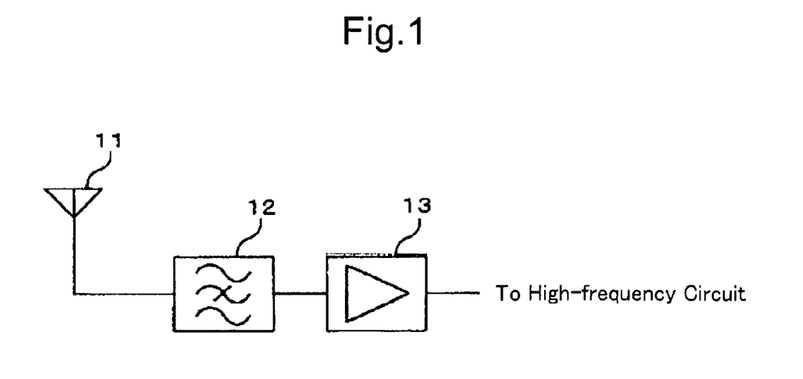
FIG. 1 is a block diagram showing the main construction of a receiving device comprising a low noise amplification circuit according to an embodiment of the present invention.

A preferred embodiment of the present invention is described below with reference to the figures. FIG. 1 is a block diagram showing a receiving device comprising a low noise amplification circuit according to an embodiment of the present invention. The receiving device in FIG. 1 includes an antenna 11 to receive electric waves, the filter 12 to remove undesired frequency components, the LNA 13 to amplify received signals at a predetermined gain, which are connected in sequence, and a high-frequency circuit thereafter in which the received signals to be amplified with low-noise are processed. The low noise circuit according to the present invention comprises the filter 12 and the LNA 13.

A GPS receiving device to receive electric waves from GPS satellites is described as an example of the receiving device in FIG. 1. In this case, the frequency characteristic of the antenna 11 is designed so that signals with a desired frequency of 1.57 GHz in a frequency band for GPS will be received. The output impedance of the antenna 11 is set to be the characteristic impedance, which is 50 Ω in general. That is, it is possible to use an antenna matching circuit connected at the output terminal of the antenna 11, not shown, for impedance matching for example.

The filter 12 has a frequency characteristic to remove undesired frequency components along with passing signals within desired frequency band. Any of a band-pass filter, a band-stop filter, a low-pass filter and a high-pass filter can be used as the filter 12. A band-pass filter is preferred when various kind of undesired waves exist around the desired frequency band. A band-stop filter is preferred when undesired waves with large power and specific frequencies exist close to the desired frequency band. For example, it is necessary to remove the frequency band of 0.9 to 1 GHz for cellular phones (PDC) in order to receive low noise GPS signals with a frequency of 1.57 GHz when the cellular phones are used close to GPS devices.

Figure 2:
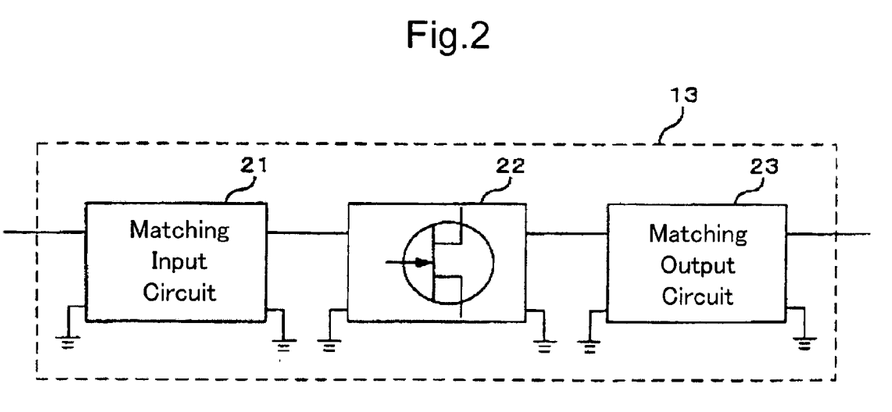
FIG. 2 is a block diagram showing an internal construction of the LNA according to the embodiment of the present invention.

Received signals with weak power from which undesired frequency components are removed by means of the filter 12 are input to the LNA 13. FIG. 2 is a block diagram showing an internal construction of the LNA 13. The LNA 13 includes the matching input circuit 21, the amplifying element 22 and the matching output circuit 23 which are connected in sequence.

In this configuration, such an element device as an FET which has an excellent noise characteristic in high frequency band is used as the amplifying element 22, amplifies input signals at a predetermined gain. Next, the matching input 21 is a circuit for impedance matching between the filter 12 connected at the input terminal of the matching input circuit 21 and the amplifying element 22. The matching output circuit 23 is a circuit for impedance matching between the amplifying element 22 and a high frequency circuit connected at the output terminal of the matching circuit 23.

The high frequency circuit to which output signals from the LNA 13 are input may be formed in various manner depending on functions required for the receiving device. For example, the high frequency circuit may include a circuit to combine filters and amplifiers in multiple stages, or demodulation circuit to demodulate received signals, and the like.

Figure 3A:
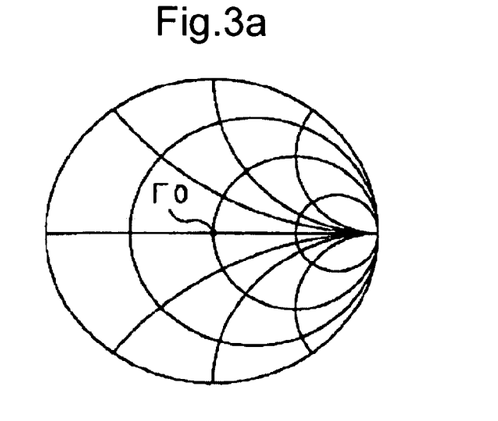
FIG. 3a, FIG. 3b and FIG. 3c show the conditions of impedance matching respectively in the filter, the matching input circuit and the amplifying element according to the present embodiments on a Smith charts.
Figure 3B:
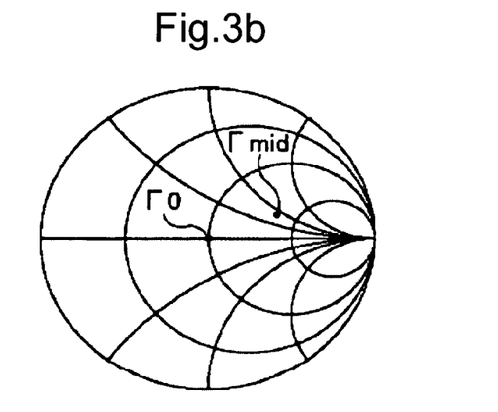
Figure 3C:
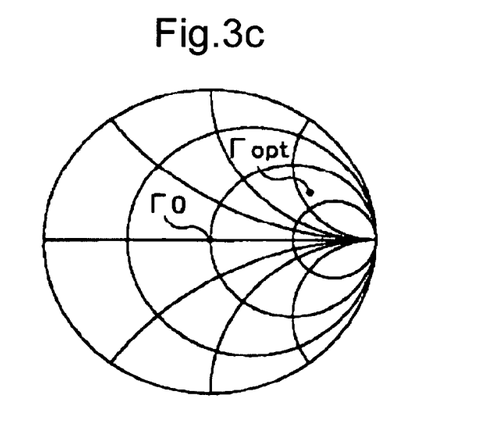

In embodiments of the present invention, the impedance matching is effected at the respective connection points in the filter 12, the matching input circuit 21 and the amplifying element 22 which are connected in sequence. FIG. 3a to FIG. 3c show the conditions of the respective impedance matching in the filter, the matching input circuit and the amplifying element according to the present embodiments by use of Smith charts.

At first, the input impedance of the filter 12 is set to be roughly the characteristic impedance $Z_0$, which is in usual 50 Ω, since the antenna 11 or the matching circuit thereof is connected to the input side of the filter 12. The Smith charts in FIG. 3a to FIG. 3c show the respective reflection factors to matching impedances with the center points as the basis, which correspond to the characteristic impedance $Z_0$. As shown in FIG. 3a, since the input impedance of the filter 12 is set so as to match with the characteristic impedance $Z_0$, the reflection factor at the front end of the filter 12 is described as the $\gamma_0$ at the center of the Smith chart which means no reflection. Here, respective reflection factors are expressed by means of complex numbers with amplitude components and phase components, or real parts and imaginary parts.

Meanwhile, as shown in FIG. 3b, as the output impedance of the filter 12 is set so as to match with a specific impedance $Z_{mid}$ different from the characteristic impedance $Z_0$, the reflection factor at the back-end of the filter 12 is expressed by means of the $\gamma_{mid}$ corresponding to the distance between the center point and the position of the impedance $Z_{mid}$ on the Smith chart. In the same way, the input impedance of the matching input circuit 21 is set to $Z_{mid}^*$ ("*" shows complex conjugate.) so as to match with the above impedance $Z_{mid}$. In this case, the reflection factor $\gamma_{mid}$ may be set to be various values under the condition that the output impedance of the filter 12 matches with the input impedance of the matching input circuit 21 so as not to occur reflections due to mismatching.

Furthermore, the noise characteristic of the amplifying element 22 is determined depending on the input impedance thereof, and therefore it is necessary to set the reflection factor at the front end of the amplifying element 22 to be the noise-optimized signal-source reflection factor $\gamma_{opt}$ in order to optimize the noise characteristic. As shown in FIG. 3c, the noise-optimized signal-source reflection factor $\gamma_{opt}$ is determined depending on the distance between the center point and the position corresponding to the predetermined impedance $Z_{opt}$. Accordingly, as shown in FIG. 2, the output impedance of the matching input circuit 21 is set so as to optimize the noise characteristic of the amplifying element 22, and it is necessary to accord the reflection factor at the back-end of the matching input circuit with the noise-optimized signal-source reflection factor $\gamma_{opt}$ along with this.

Here, the matching output circuit may be designed depending on the output impedance of the amplifying element 22 and the impedances of the circuit parts used thereafter. In this case, it is preferred to determine the design condition for the matching output circuit 23 in consideration of necessary gain of the LNA and stability of operation.

In the present embodiment, it is possible to simplify the matching input circuit 21 where the above described LNA 13 is employed. More specifically, when the reflection factors $\gamma_0$s at both of the front end and back-end of the filter 12 are set to be zero where the input impedance and output impedance of the filter 12 are matched with the characteristic impedance $Z_0$ as shown in the conventional construction, it is necessary to adjust the matching input circuit 21 to transform the impedance to the relatively far position on a Smith chart from the reflection factor $\gamma_0$ to the noise-optimized signal-source reflection factor $\gamma_{opt}$. On the contrary, in the present embodiment, it is possible to set the reflection factor at the back-end of the filter 12 to be the reflection factor $\gamma_{mid}$ to transform the impedance to relatively near position on a Smith chart from the reflection factor $\gamma_{mid}$ to the noise-optimized signal-source reflection factor $\gamma_{opt}$, and moreover it is possible to obtain the characteristics of the LNA 13 equal to or more than a conventional LNA.

Next, a specific design example of the present embodiment is described below. The operating conditions as described below are for a GPS receiving device. Here, there is used a band-stop filter to remove frequency bands for cellular phone (PDC) as the filter 12, there is used an amplifier which can amplify GPS signals with a GPS frequency as the LNA 13, and there is used a GaAs FET as the amplifying element 22, respectively. However, as described below, conventional examples with such constituent elements as the above constituent elements are also described in order to compare with the specific design example of the present embodiment.

The noise-optimized signal-source reflection factor $\gamma_{opt}$ of the amplifying element 22 has amplitude of 0.582 and a phase angle of 27.004 degree corresponding to the above operating condition.

Figure 4A:
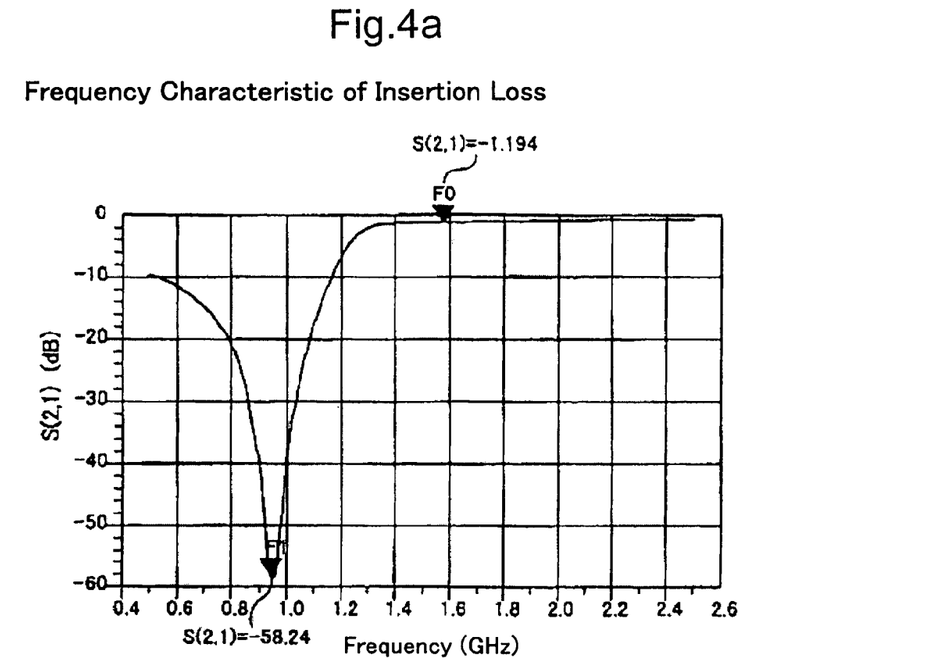
FIG. 4a shows the frequency characteristics of the insertion loss.
Figure 4B:
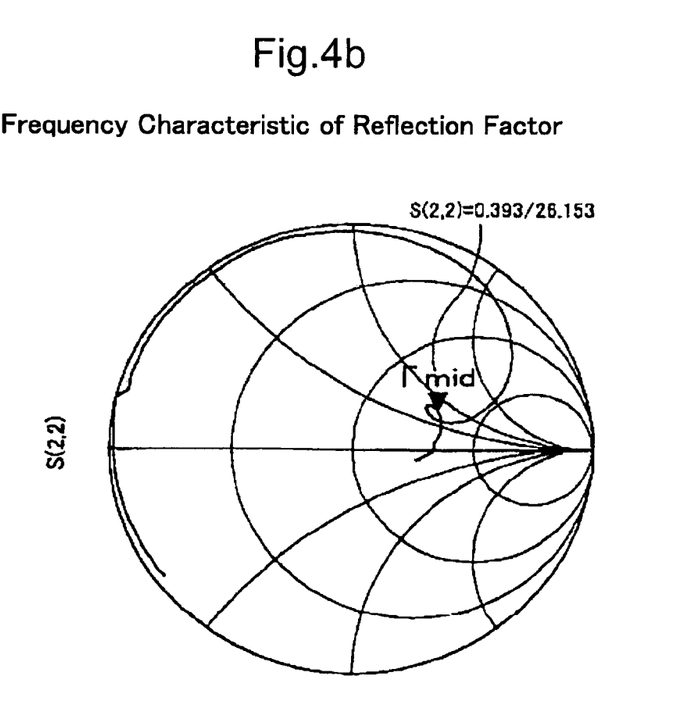
FIG. 4b shows the reflection factor at the output terminal.

The filter 12 has the characteristics as shown in FIG. 4a and FIG. 4b. FIG. 4a shows the frequency characteristics of the insertion loss of the filter 12 based upon the design according to the present invention. As shown in FIG. 4a, the insertion loss of the filter 12, which is shown as an S-parameter S21, changes in the frequency range of 0.4 to 2.6 GHz. It is shown that the filter 12 passes signals within the frequency band for GPS with an insertion loss of about 1 dB, and at the same time, an attenuation amount for the GPS frequency band is about 58 dB.

FIG. 4b shows the frequency characteristics of the reflection factor at the output terminal of the filter 12. As shown in FIG. 4b, the reflection factor (the impedance) at the output terminal of the filter 12, which is shown as a S-parameter S22, changes along the path on the Smith chart corresponding to frequency changes. And in the frequency band for PDC, the reflection factor $\gamma_{mid}$ has roughly amplitude of 0.393 and a phase angle of 26.163 degree.

Figure 5A:
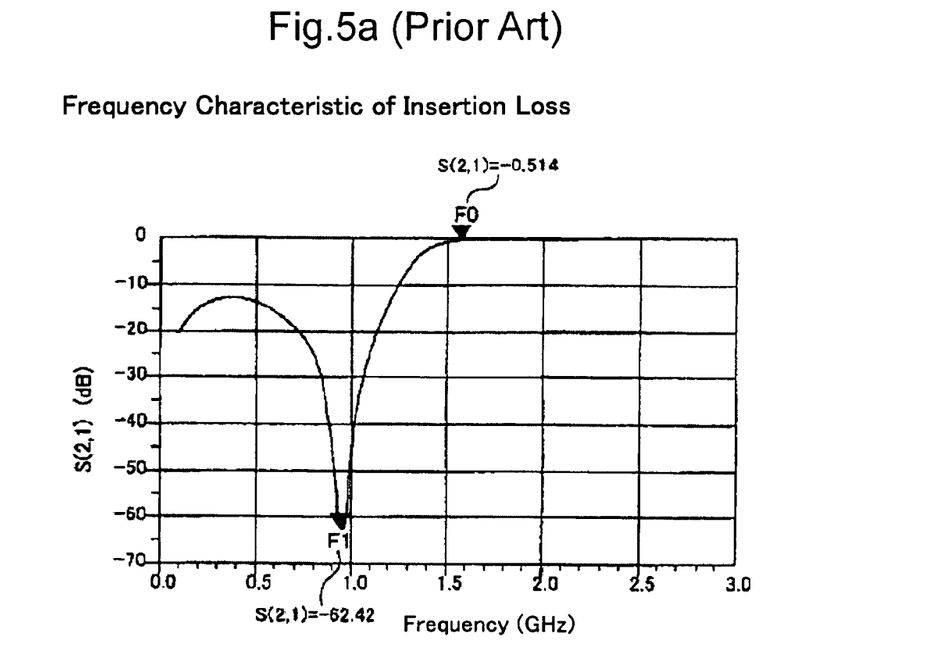
FIG. 5a shows the frequency characteristics of the insertion loss.
Figure 5B:
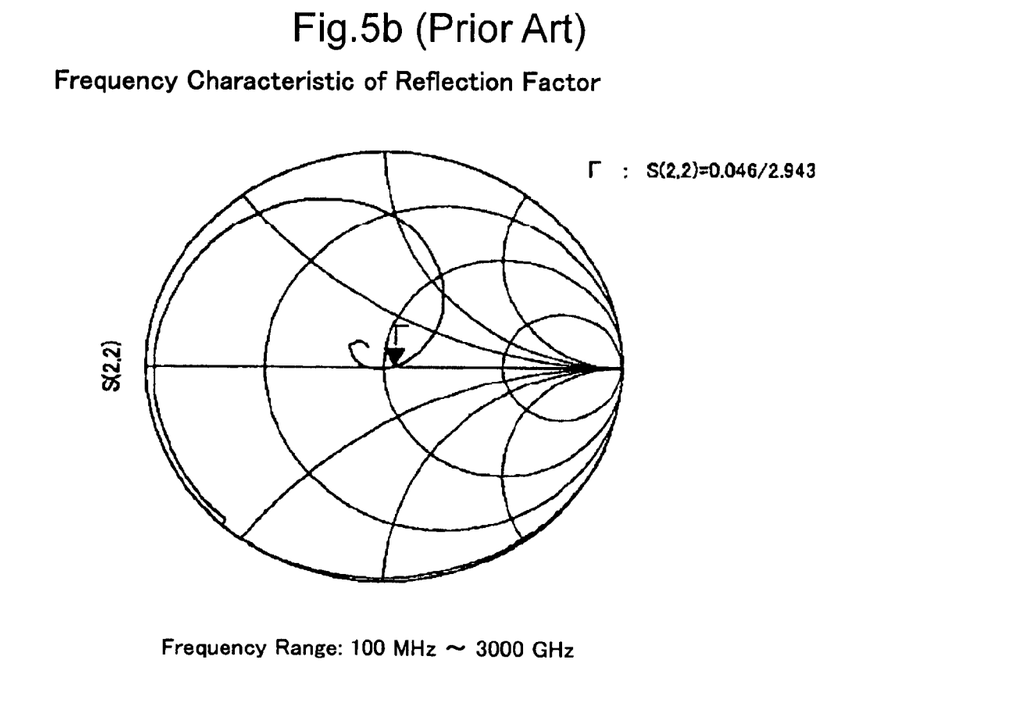
FIG. 5b shows the reflection factor at the output terminal.

FIG. 5a and FIG. 5b show the characteristics of a filter with a conventional construction corresponding to the above filter 12. FIG. 5a and FIG. 5b show the characteristics of the filter whose input and output impedances match with the characteristic impedance based upon the similar condition to that in FIG. 4a and FIG. 4b. The frequency characteristic of insertion loss as shown in FIG. 5a is similar to that as shown in FIG. 4a, but the frequency characteristic of reflection factor as shown in FIG. 5b is entirely different from that as shown in FIG. 4b. The filter with the conventional construction has an output impedance matching with the characteristic impedance Z.sub.0, and therefore the reflection factor at the output terminal of the filter is close to zero. On the contrary, the filter 12 of the present embodiment has an output impedance meaningly misaligned from the characteristic impedance Z.sub.0, and the reflection factor gammma.sub.mid in this case has a predetermined value quite more than zero. And the reflection factor gammma.sub.mid has a value less the noise-optimized signal-source reflection factor gamma.sub.opt, that is, close to the center of a Smith chart. Therefore it is necessary to transform the input impedance of the amplifying element 22 from the gammma.sub.mid to the gammma.sub.opt.

Figure 6A:
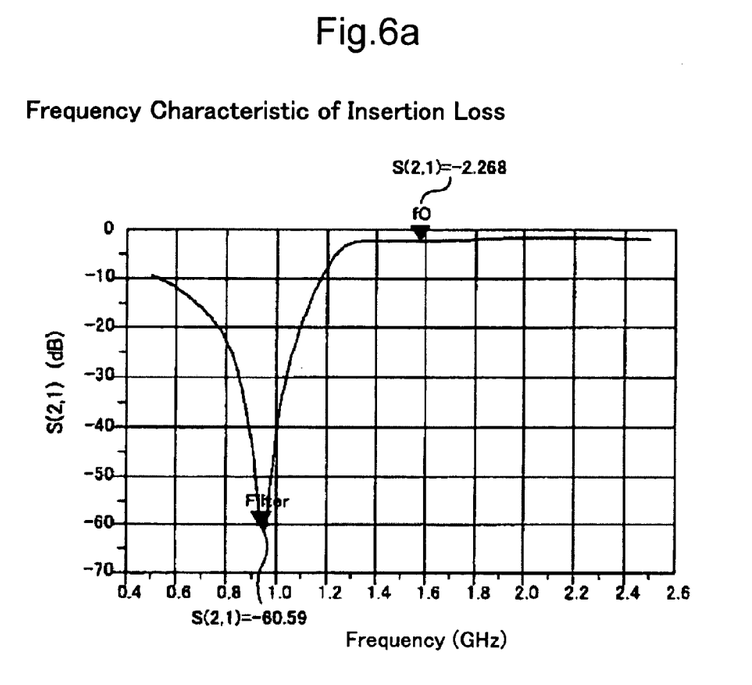
FIG. 6a shows the frequency characteristics of the insertion loss.
Figure 6B:
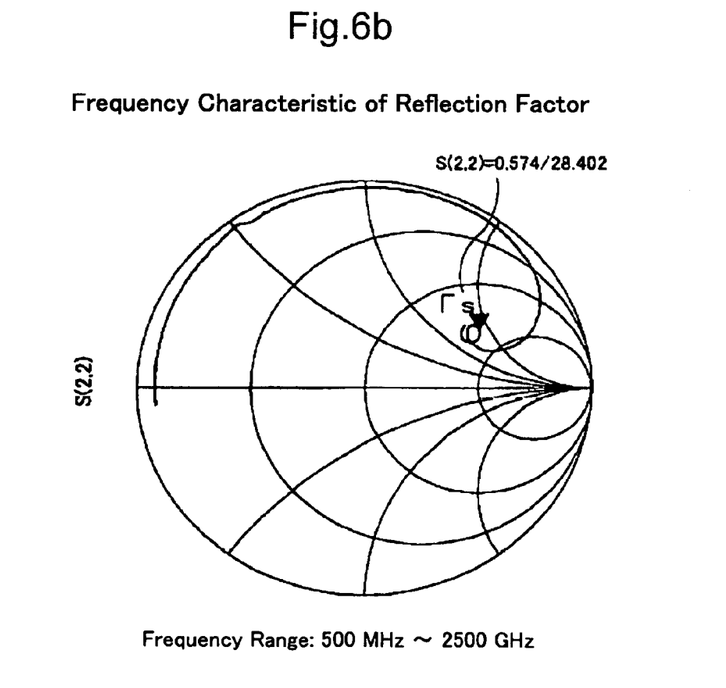
FIG. 6b shows the reflection factor at the output terminal.

The circuit part where the matching input circuit 21 is connected to the output terminal of the filter 12 has the characteristics as shown in FIG. 6a and FIG. 6b. FIG. 6a shows the frequency characteristics of the insertion loss in the circuit part comprising the filter 21 and the matching input circuit 21. The characteristic as shown in FIG. 6a is roughly similar to that as shown in FIG. 4a. FIG. 6b shows the characteristic of the reflection factor at the output terminal of the circuit part comprising the filter 21 and the matching input circuit 21. The characteristic as shown in FIG. 6b is different from that as shown in FIG. 4b, and the reflection factor gamma.sub.s has amplitude of about 0.574 and a phase angle of about 28.402 degree in the frequency band for GPS. This reflection factor gamma.sub.s is set to a value relatively close to or roughly equal to the noise-optimized signal-source reflection factor gamma.sub.opt.

Figure 7A:
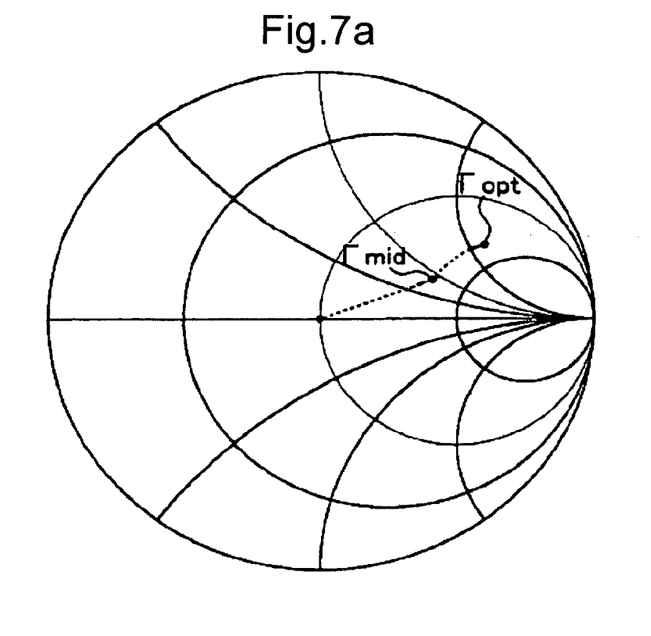
FIG. 7a shows the impedance transformation of a construction of the embodiment.
Figure 7B:
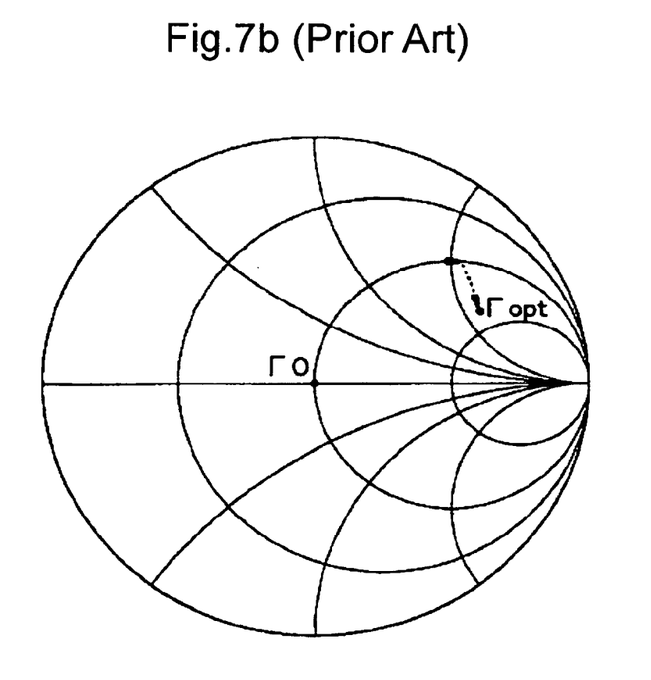
FIG. 7b shows the impedance transformation of a conventional construction.

FIG. 7a and FIG. 7b show the concept of impedance transformation in order to change the reflection factor gamma.sub.mid to gamma.sub.opt in a Smith chart. The following description is based upon the gamma.sub.s equal to the gamma.sub.opt as described above. FIG. 7a shows the impedance transform from the gamma.sub.mid to the gamma.sub.opt in the construction of the embodiment, and FIG. 7b shows the impedance transformation from the gamma.sub.0 to the gamma.sub.opt in the conventional construction for comparison.

In FIG. 7a, the reflection factor is transformed from the gamma.sub.0 corresponding to the characteristic impedance Z.sub.0, which is at the center of the Smith chart, to the gamma.sub.mid by means of the filter 12. And the reflection factor is transformed from the gamma.sub.mid to the gamma.sub.opt by means of the matching input circuit connected to the filter 12. While, in FIG. 7b, the reflection factor is directly transformed from the gamma.sub.0, which is at the center of the Smith chart, to the gamma.sub.opt by means of the matching input circuit 21.

Figure 8A:
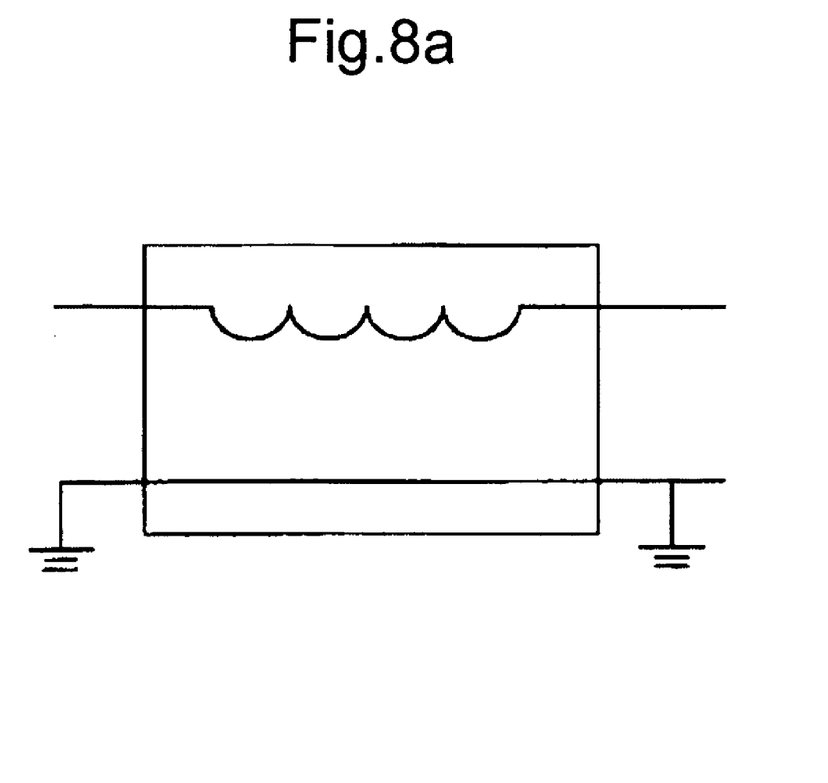
FIG. 8a shows a constructional example of the embodiment.
Figure 8B:
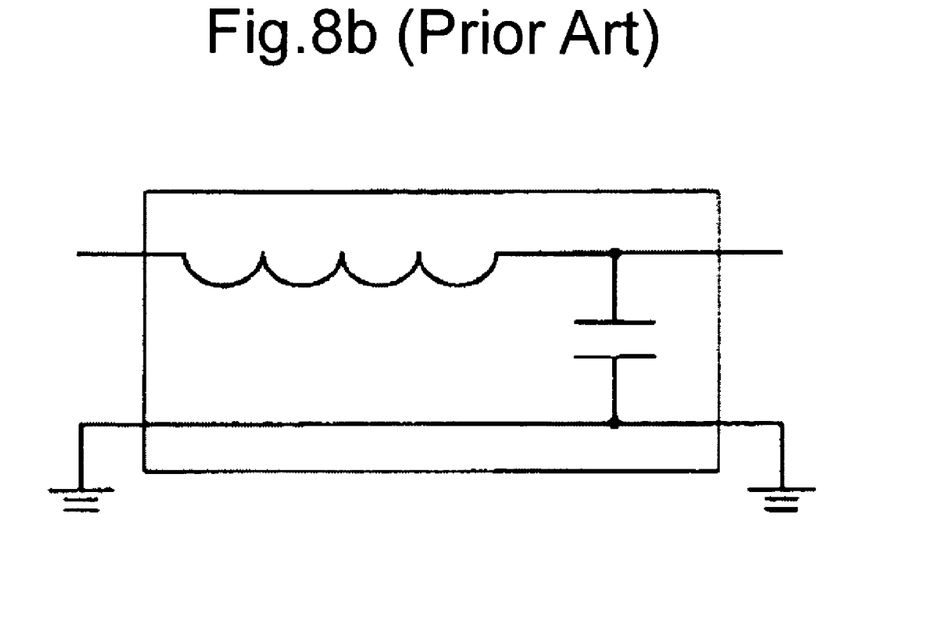
FIG. 8b shows a conventional constructional example.

Meanwhile, FIG. 8a and FIG. 8b show examples of the matching input circuit 21 for the impedance transformation as shown in FIG. 7a and FIG. 7b. FIG. 8a is a example of the matching input circuit 21 according to the present embodiment, which is a construction using serial inductors. On the contrary, FIG. 8b is a conventional example of the matching input circuit, which is a construction using parallel capacitors along with serial inductors. In this way, as there is reduced a change of the reflection factor on the Smith chart in the matching input circuit 21 according to the present embodiment, the construction of the matching input circuit 21 can be simplified compared to the conventional construction. Here, the matching input circuit 21 of the present embodiment can be made of parallel capacitors depending on settings of the reflection factor gamma.sub.mid, but can be made of at most one reactance element.

Next, there is described the noise figure characteristic of the LNA 13 according to the present embodiment. At first, when S-parameters of the stand-alone matching input circuit is illustrated as shown in the following formula (1), $$\text{Matrix} S.sub.M = \begin{bmatrix} S.sub.M11 & S.sub.M12 \\ S.sub.M21 & S.sub.M22 \end{bmatrix} \quad (1)$$

the deterioration amount of noise figure N.sub.m (dB) of the matching input circuit 21 is illustrated as shown in the following formula (2).

$$\begin{aligned} N.sub.m \\ (dB) \end{aligned} = -10 \text{Log}[|S.sub.M21|^2 / (1 - |S.sub.M21|^2)] \quad (2)$$
$$= -10 \text{Log}|S.sub.M21|^2 + 10 \text{Log}(1 - |S.sub.M21|^2)$$

And, the insertion loss of 50 ohms system L.sub.m is illustrated as shown in the following formula (3) by means of calculating from the above two formulas.

$$L.sub.m(dB) = -10 \text{Log}|S.sub.M21|^2 \quad (3)$$
$$= N.sub.m - 10 \text{Log}(1 - |S.sub.M22|^2)$$

The above formula (3) shows that there is some difference between the deterioration amount of noise figure N.sub.m and the insertion loss L.sub.m by a loss improvement amount of the insertion loss due to the impedance matching at the back-end of the matching input circuit 21 in relation to the insertion loss of the matching input circuit. In this case, when the output impedance of the matching input circuit 21 in the construction of the present embodiment is equal to that in the construction of the conventional example, the noise figure will be improved by the loss improvement amount of 50 ohms system.

Based upon the above formula (3), the following formula (4) is introduced with use of the insertion loss L.sub.i of a circuit part, the reflection factor gamma.sub.s at the back-end of the circuit part and the insertion loss L.sub.f of the simple filter 12. Here, the circuit part is constituted by the filter 12 and the matching input circuit 21, and the input and output impedances of the filter 12 are set to the characteristic impedance.

$$L.sub.i(dB) < L.sub.f + N.sub.m - 10 \text{ Log}(1 - |\text{gamma.sub.}s|^2) \quad (4)$$

The noise figure of a receiving device is kept good by means of determining the design conditions of the filter 12 and the LNA 13 so as to meet the above formula (4).

And, it is preferred to apply the following formulas (5) or (6) instead of the above formula (7) in order to improve the noise characteristics moreover.

$$L.sub.i(dB) < L.sub.f + N.sub.m - 0.1 - 10 \text{ Log}(1 - |\text{gamma.sub.}s|^2) \quad (5)$$

$$L.sub.i(dB) < L.sub.f - 10 \text{ Log}(1 - |\text{gamma.sub.}s|^2) \quad (6)$$

Figure 9A:
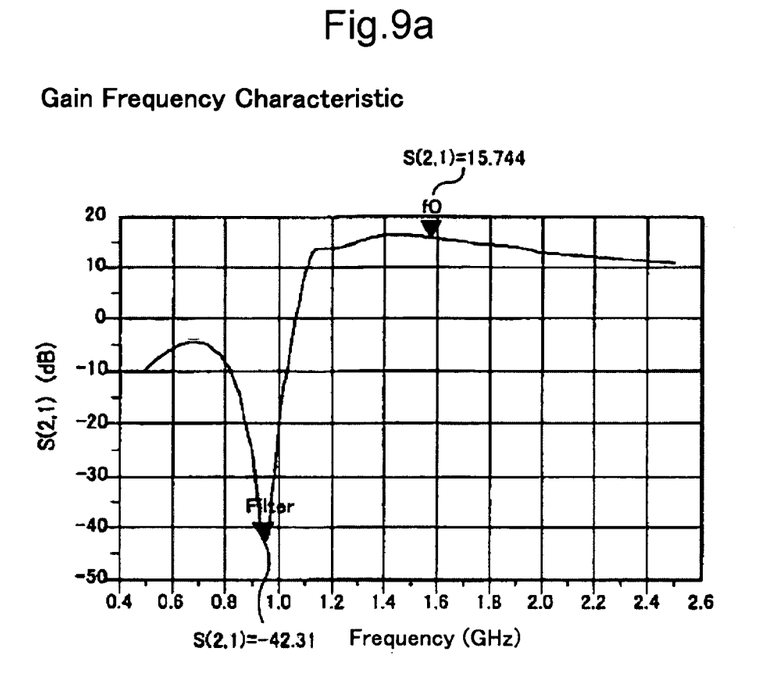
FIG. 9a and FIG. 9b show the characteristics of the filter and the LNA in the embodiment, and show the frequency characteristics of gain and noise figure respectively.
Figure 9B:
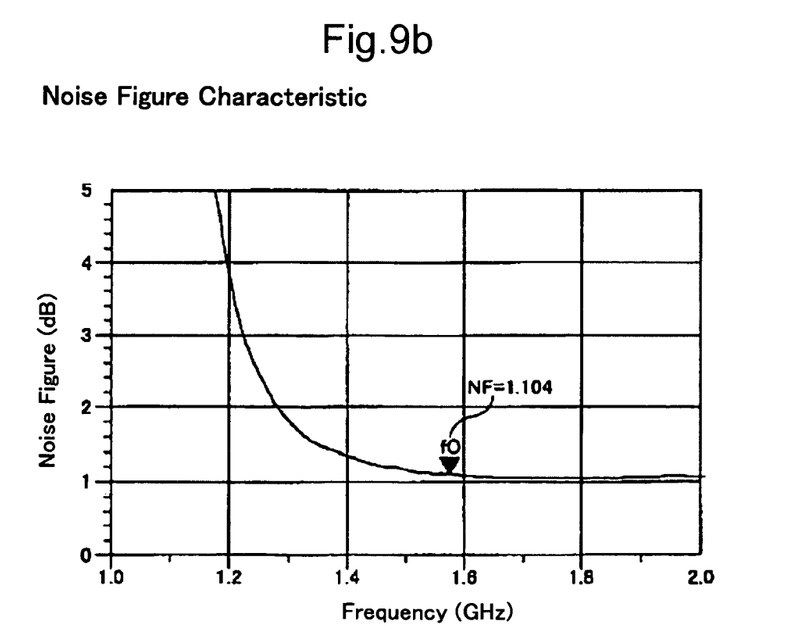

Next, there is described the characteristics of the filter 12 and the LNA 13 integrated in the present embodiment. FIG. 9a and FIG. 9b show the characteristics of the filter 12 and the LNA 13 in the present embodiment, and FIG. 10a and FIG.

Figure 10A:
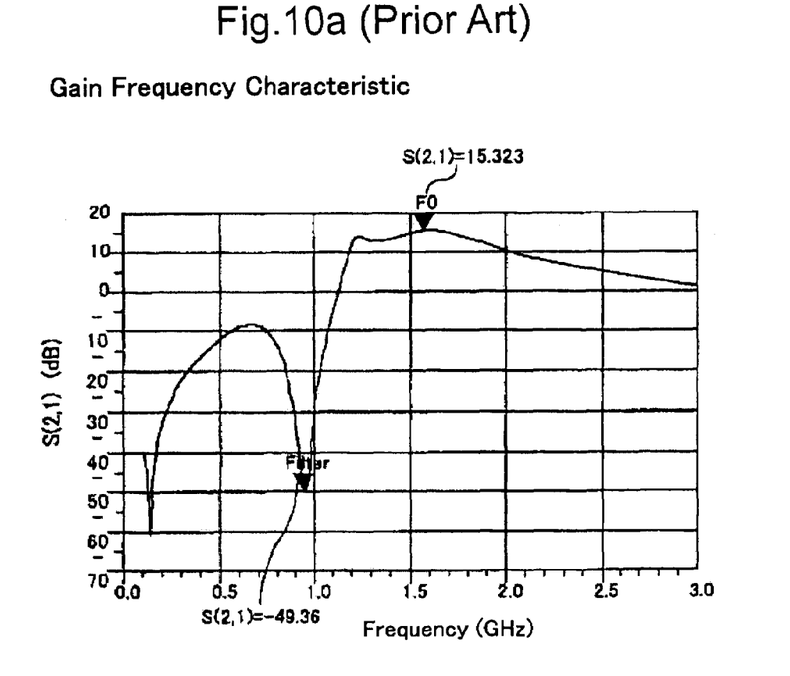
FIG. 10a and FIG. 10b show the characteristics of the filter and the LNA in a conventional example corresponding to the embodiment, and show the frequency characteristics of gain and noise figure respectively.
Figure 10B:
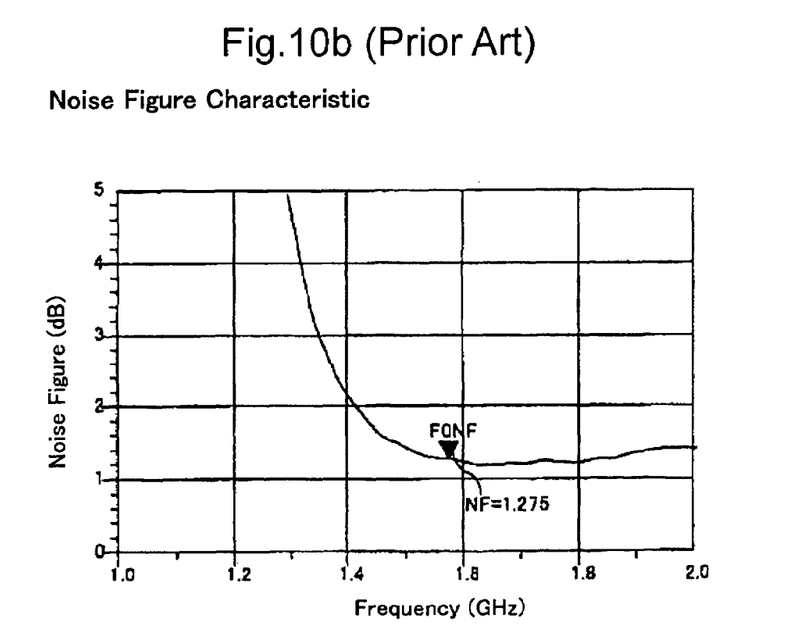

10b show the characteristics of the filter 12 and the LNA 13 in a conventional example for comparison. FIG. 9a shows the gain-frequency characteristic of the whole of the filter 12 and the LNA 13, and FIG. 10a shows the similar characteristic of the conventional construction. In the frequency band for GPS among predetermined frequency bands, while the low noise amplification circuit according to the present embodiment had a gain of 15.744 dB, the noise amplification circuit with the conventional construction had a gain of 15.323 dB.

Next, FIG. 9b shows the noise figure frequency characteristic of the whole of the filter 12 and the LNA 13, and FIG. 10b shows the similar characteristic of the conventional construction. In the frequency band for GPS among a frequency range of 1 to 2 GHz, while the low noise amplification circuit according to the present embodiment had noise figure of 1.104 dB, the noise amplification circuit with the conventional construction had noise figure of 1.275 dB.

And, FIG. 6a and FIG. 6b shows the insertion loss $L_i$ in the circuit part made of the filter 12 and the matching input circuit 21 was 2.268 dB. And the noise figure deterioration amount $N_i$ in a similar circuit is 0.548 dB. Meanwhile, FIG. 5a and FIG. 5b show that the insertion loss of the simple filter 12 in the 50 ohms system was 0.514 dB, and that the noise figure deterioration amount $N_m$ is 0.219 dB, and FIG. 6a and FIG. 6b show the reflection factor $\gamma_s$ is 0.574. Therefore, the right-hand side of the formula (4) was calculated as shown in the following formula (7).

$$\frac{L_f + N_m - 10\log(1 - |\gamma_s|^2)}{} = 0.514 + 0.219 + 10\log(1 - 0.574^2) = 2.469 \quad (7)$$

The above $L_i$ of 2.268 dB is less than the calculation result of the right-hand side, and therefore the formula (4) was met. In such as GPS receiving device described as a specific embodiment, the $F_{min}$ is 0.5 to 0.7 dB, and the noise figure of the low noise amplifier is 1.0 to 1.5 dB, and therefore noise figure improvement of 0.1 dB also provides significant effect. In the construction of the present embodiment, the right-hand side of the formula (5) was calculated as shown in the following formula (8).

$$\frac{L_f + N_m - 0.1 - 10\log(1 - |\gamma_s|^2)}{} = 0.514 + 0.129 - 0.1 + 10\log(1 - 0.574^2) = 2.369 \quad (8)$$

The above $L_i$ of 2.268 dB is less than the calculation result of the right-hand side of the formula (5), and therefore the formula (5) is met. So it was shown to improve noise figure efficiently by use of the present embodiment. Sequentially, it was proved that the construction of the present embodiment can improve noise figure by about 0.18 dB without the deterioration of gain characteristics compared to the conventional construction.

Next, there is described another embodiment according to the present invention. In the above embodiment, there was described the case that the reflection factor $\gamma_{mid}$ was different from the noise-optimized signal-source reflection factor $\gamma_{opt}$. In this another embodiment, there is described the construction with the $\gamma_{mid}$ equal to the $\gamma_{opt}$. Here, the construction and the operation of the filter 12 and the matching input circuit 21 is similar to those of the above embodiment, and the description thereof is omitted.

Figure 11A:
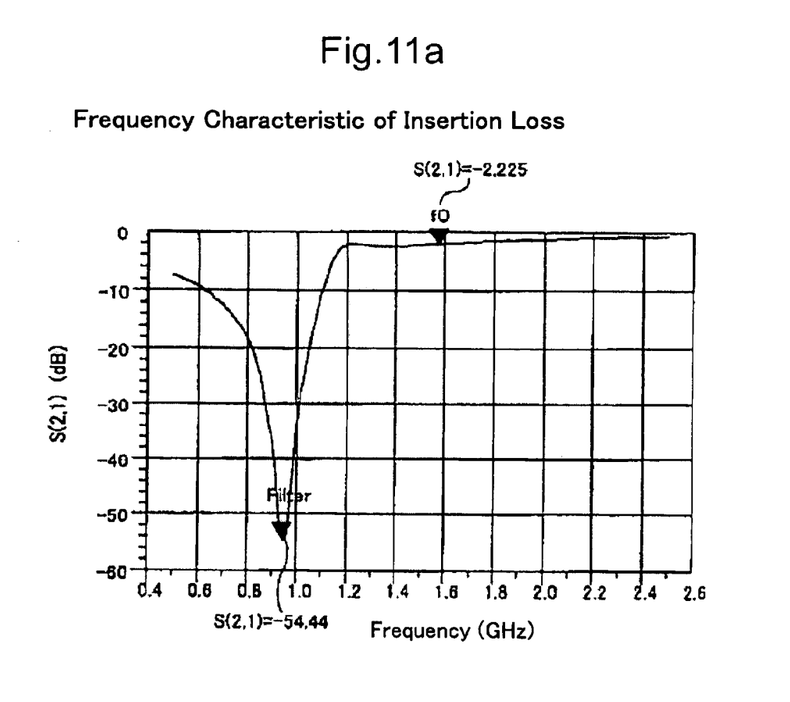
FIG. 11a and FIG. 11b show the characteristics of the filter designed as another embodiment according to the present invention, and show respectively the frequency characteristics of the insertion loss and the reflection factor at the output terminal.
Figure 11B:
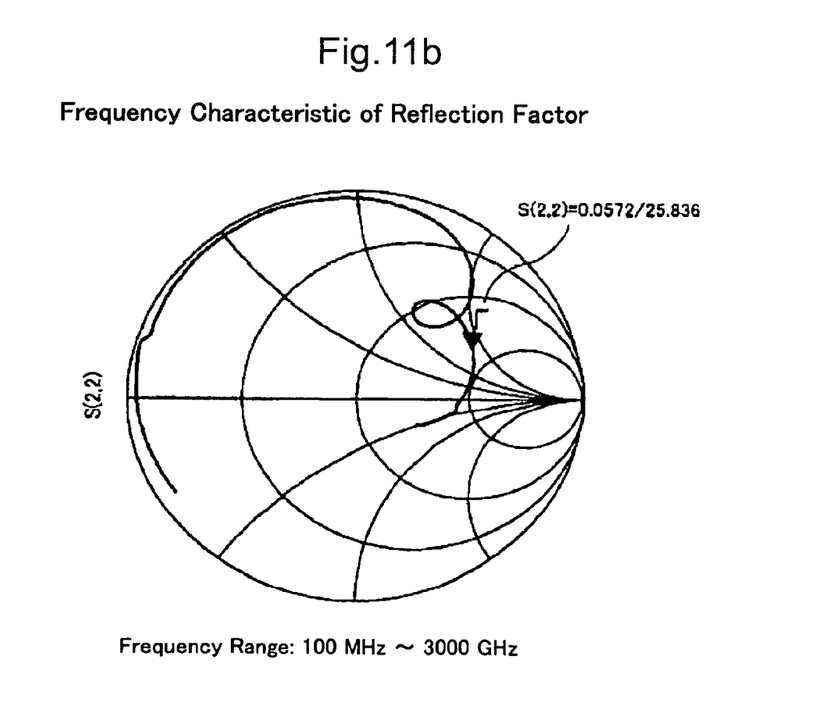

FIG. 11a and FIG. 11b show the characteristics of the filter 12 in another embodiment. FIG. 11a shows the insertion loss frequency characteristic of the filter 12, and FIG. 11b shows the frequency characteristic of the reflection factor at the back-end of the filter 12. This filter 12 is a band-stop filter made of two series resonant circuits connected serially, and has an attenuation of about 54 dB within the frequency band for cellular phones (PDC). Furthermore, within the frequency band for GPS, there was obtained the $\gamma_{mid}$ with amplitude of 0.574 and a phase angle of 26.077 degree, which is roughly equal to the $\gamma_{opt}$.

Figure 12A:
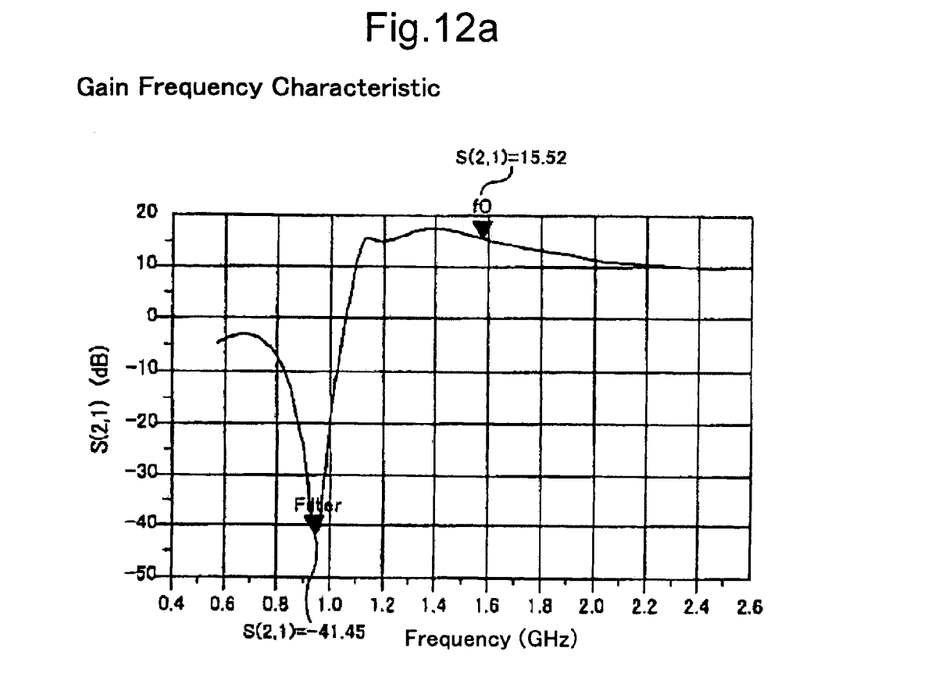
FIG. 12a and FIG. 12b show the characteristics of the filter and the LNA in another embodiment, and show the frequency characteristics of gain and noise figure respectively.
Figure 12B:
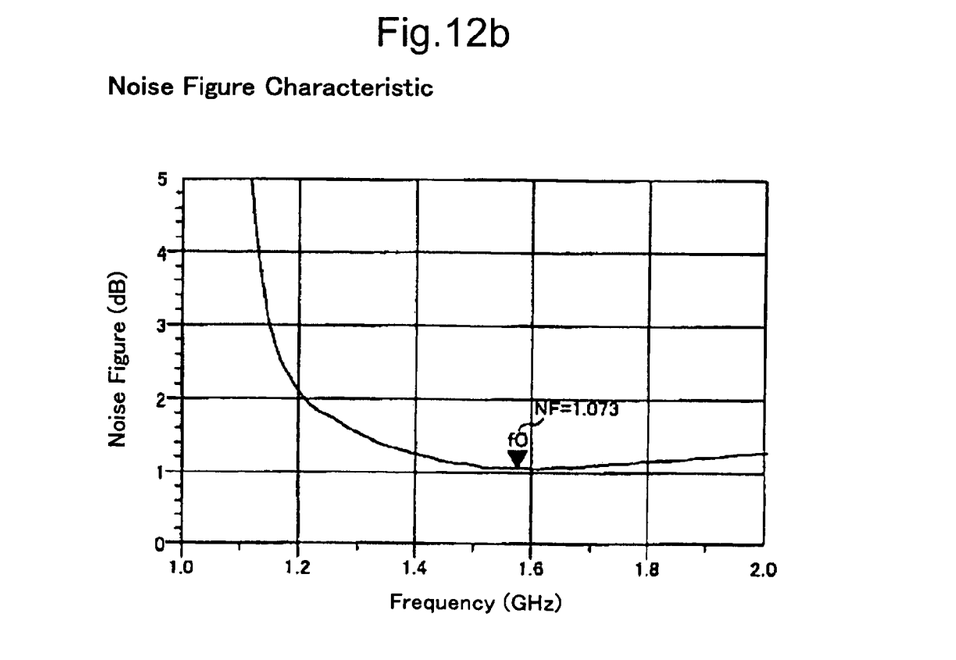

FIG. 12a and FIG. 12b show the characteristics of the filter 12 and the matching input circuit 21 in the present another embodiment. FIG. 12a shows a gain frequency characteristic of the whole of the filter 12 and the matching input circuit 21 in the present another embodiment, FIG. 12b shows the characteristic of noise figure. As shown in FIG. 12a and FIG. 12b, the present another embodiment had a gain of 15.52 dB and noise figure of 1.073 dB, and could improve the noise figure by 0.21 dB.

Here, in the present another embodiment, the circuit part made of the filter 12 and matching input circuit 21 had a insertion loss $L_i$ of 2.225 dB, and the noise figure deterioration amount $N_i$ of 0.496 dB. Therefore the right-hand side of the formula (6) was calculated as shown in the following formula (9), and the calculation result shows more improvement compared to the above embodiment.

$$L_f - 10 \log(1 - |\gamma_s|^2) = 0.514 + 10 \log(1 - 0.574^2) = 2.250 \quad (9)$$

It is possible to apply the present invention as described above to various devices including low noise amplification circuits, which are made of the filter and the LNA, without limitation to the above constructions of the embodiments. And it is possible to apply the present invention in order to amplify not only the signals received by means of antennas, but also weak high-frequency signals with excellent noise characteristics.

According to the present invention, in the result that the filter to remove undesired frequency components and the matching input circuit necessary for impedance transformations are arranged at the front end of the amplifying element, and that respective reflection factors and impedances are designed so as to meet predetermined conditions, there is reduced the deterioration of the noise characteristics, which occurs due to insertion losses, and there is realized the noise characteristics more excellent compared to the conventional construction. In addition to that, as it is possible to make impedance transformations with use of simple constructions, it is possible to improve the noise characteristics with reduction of the number of parts and reduction of costs.

The present invention is not limited to the above described embodiments, and various variations and modifications may be possible without departing from the scope of the present invention.

This application is based on the Japanese Patent application No. 2005-157951 filed on May 30, 2005, entire content of which is expressly incorporated by reference herein.

What is claimed is:

1. A low noise amplification circuit which amplifies signals by a predetermined gain, comprising:

at least a low noise amplifier including
   an amplifying element, and
   a matching input circuit coupled to an input terminal of the amplifying element; and
a filter coupled to an input terminal of the low noise amplifier, wherein when $\gamma_s$ represents a reflection factor, an impedance conversion for the $\gamma_s$ is set at a predetermined value such that an output impedance of the filter at the predetermined value is set to be different from that of a characteristic impedance of the filter so that signals flow from the input terminal of the amplifying element to the output terminal of the matching input circuit,
an insertion loss of the filter and matching input circuit satisfies a condition according to a formula $$L_i < L_f + N_m - 10 \operatorname{Log}(1-|\gamma_s|^2)$$

where $L_f$ (dB) represents an insertion loss of the filter in a case that both of the input and output impedances of the filter are set to be the characteristic impedance of the filter, $L_i$ (dB) represents an insertion loss of a circuit consisting of the matching input circuit and the filter, and $N_m$ (dB) represents a degradation amount of a noise figure of the matching input circuit.

2. The low noise amplification circuit of claim 1, wherein the $L_f$ (dB), the $L_i$ (dB), the $N_m$ (dB) and the $\gamma_s$ satisfy a following formula:

$$L_i < L_f + N_m - 10 \operatorname{Log}(1-|\gamma_s|^2) - 0.1.$$

3. The low noise amplification circuit of claim 1, wherein the $L_f$(dB), the $L_i$ (dB), and the $\gamma_s$ satisfy a following formula:

$$L_i < L_f - 10 \operatorname{Log}(1-|\gamma_s|^2).$$

4. The low noise amplification circuit of claim 1, wherein the $\gamma_s$ is approximately equal to a $\gamma_{opt}$, which is a noise-optimized signal-source reflection factor of the amplifying element.

5. The low noise amplification circuit of claim 1, wherein the matching input circuit consists of a reactance element.

6. The low noise amplification circuit of claim 1, wherein the input signals are high-frequency signals received by means of an antenna.

* * * * *